United States Patent [19]
Sekine et al.

[11] Patent Number: 5,465,204
[45] Date of Patent: Nov. 7, 1995

[54] HEURISTIC CONTROL SYSTEM EMPLOYING EXPERT SYSTEM, NEURAL NETWORK AND TRAINING PATTERN GENERATING AND CONTROLLING SYSTEM

[75] Inventors: Masatoshi Sekine, Kanagawa, Japan; Eric Chang, Beverly Hills, Calif.

[73] Assignee: Kabushiki Kaisha Toshiba, Kawasaki, Japan

[21] Appl. No.: 972,304

[22] Filed: Nov. 5, 1992

[30] Foreign Application Priority Data

Nov. 8, 1991  [JP]  Japan ................................ 3-293072

[51] Int. Cl.$^6$ ............................ G05B 13/02; G06F 15/18
[52] U.S. Cl. ........................... 364/152; 364/490; 395/23
[58] Field of Search ................................. 364/152, 490, 364/489; 390/20, 21, 23

[56] References Cited

U.S. PATENT DOCUMENTS

| | | | |
|---|---|---|---|
| 4,922,432 | 5/1990 | Kobayashi et al. | 364/490 |
| 5,046,020 | 9/1991 | Filkin | 395/23 |
| 5,121,467 | 6/1992 | Skeirik | 395/11 |
| 5,140,530 | 8/1992 | Guha et al. | 395/23 |
| 5,200,908 | 4/1993 | Date et al. | 364/491 |
| 5,228,113 | 7/1993 | Shelton | 395/23 |

OTHER PUBLICATIONS

"Successfully Using Peak Learning Rates of 10(and greater) in Back–Propagation Networks with the Heuristic Learning Algorithm", John P. Cater, IEEE Inter. Conf. on Neural Networks, Jun. 21–24, 1987, pp. 645–651.

"Modular Learning in Neural Networks", Dana H. Ballard, Proceedings AAAI–87 Sixth National Conference on Artificial Intelligence, Jul. 13–17, 1987, pp. 279–284.

"Calibration of Neural Networks Using Genetic Algorithm with Application to Optimal Path Planning", Smith et al., 1st Annual Workshop on Space Operations Automation & Robotics, (SOAR '87), Aug. 5–7, 1987, pp. 519–526.

Fourth Annual IEEE International ASIC Conference & Exhibit, Sep. 23–27, 1991, S. Nishio, et al., "Incremental Timing Optimization During Multiple Stages of Logic Synthesis", pp. P13–1.1–P13–1.4.

Proceedings of the IEEE, vol. 78, No. 2, pp. 264–300, Feb., 1990, R. K. Brayton et al., "Multilevel Logic Synthesis".

International Joint Conference of Neural Network, 6 pages, 1991, Eric I. Chang, et al., "Arena, A Rule Evaluating Neural Assistant That Performs Rule–Based Logic Optimization".

Primary Examiner—Paul P. Gordon
Attorney, Agent, or Firm—Oblon, Spivak, McClelland, Maier, & Neustadt

[57] ABSTRACT

A heuristic control system and method for use with a computer-aided design, capable of learning complicated control and achieving an optimizing task with a fewer number of iteration. The heuristic control system includes: rule-based system for choosing and evaluating a rule among a plurality of given rules; training system for choosing strongly a rule whose evaluation result is favorable based on a predetermined value which evaluates an evaluation result of the rule-based system, and for generating a learning pattern; and neural network for designing an optimized circuit based on a signal fed from the training system and for sending a resultant signal to the rule-based system for another iteration of heuristic control. The learning method includes the steps of: choosing and evaluating a rule among a plurality of given rules; choosing strongly a rule whose evaluation result is favorable based on a predetermined value; generating a learning pattern which brings a desirable result based on the evaluating step; designing an optimized circuit based on the learning pattern generated; and choosing and evaluating iteratively a rule among a plurality of given rules.

7 Claims, 6 Drawing Sheets

FIG.1
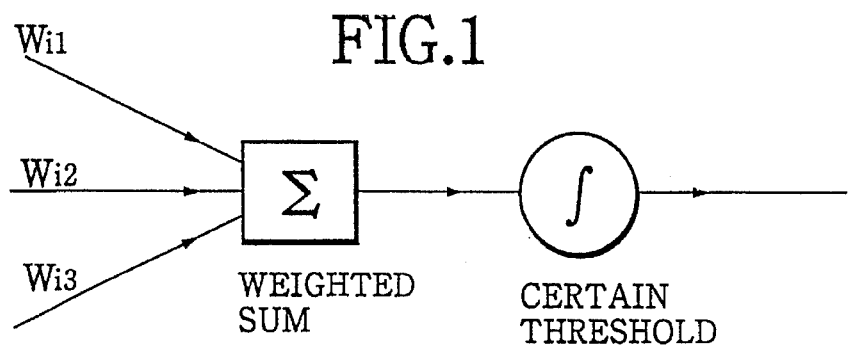
FIG.2
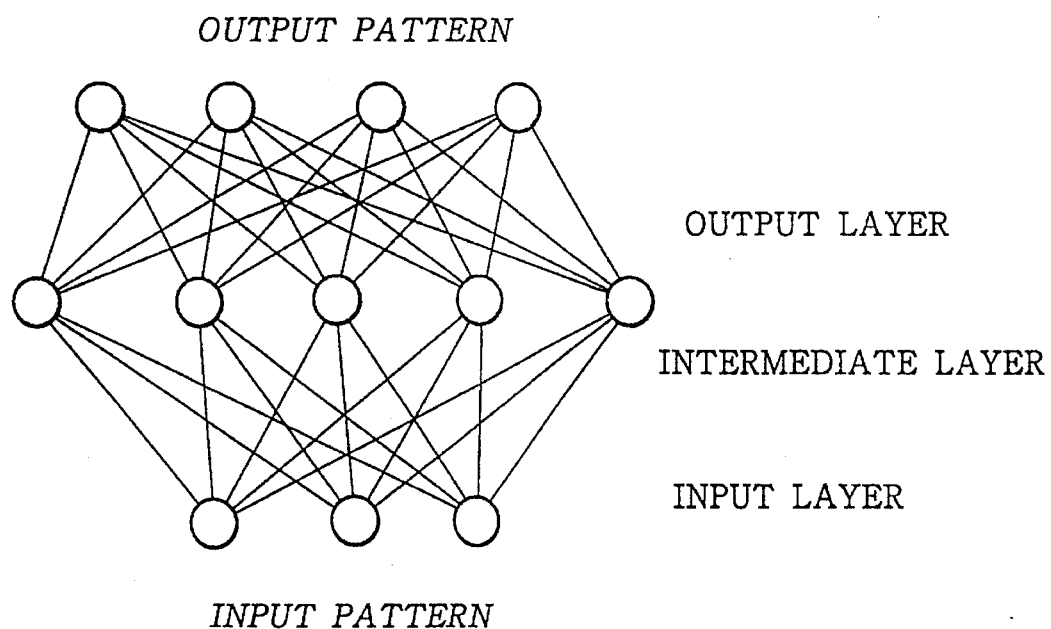
FIG.3
A+A*B*C+C*D ⇒ A+C*D         A+B ⇒ ˆ(ˆA*ˆB)
A*(ˆA+B+C) ⇒ A*(B+C)         A*B ⇒ ˆ(ˆA+ˆB)
1+A ⇒ 1                                      0+A ⇒ A
0*A ⇒ 0                                      1*A ⇒ A

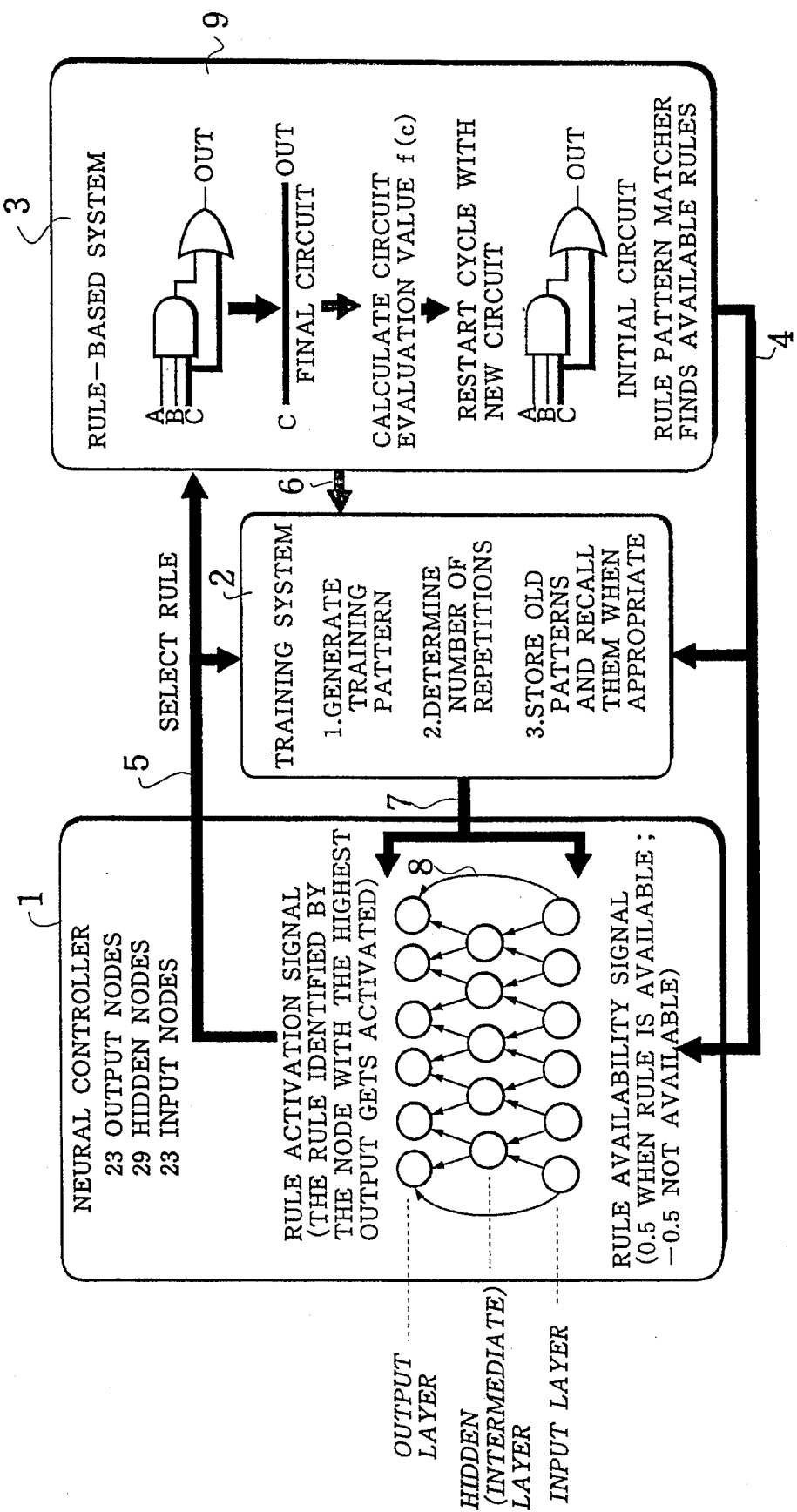

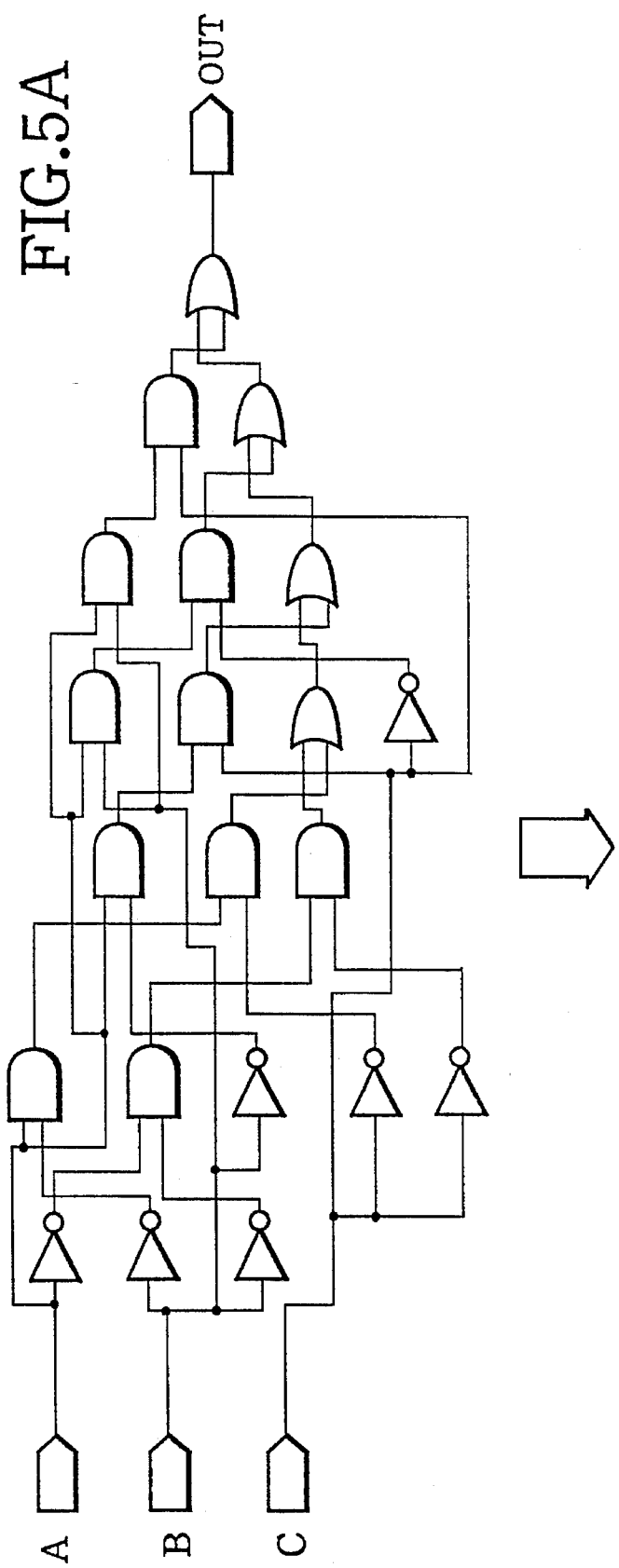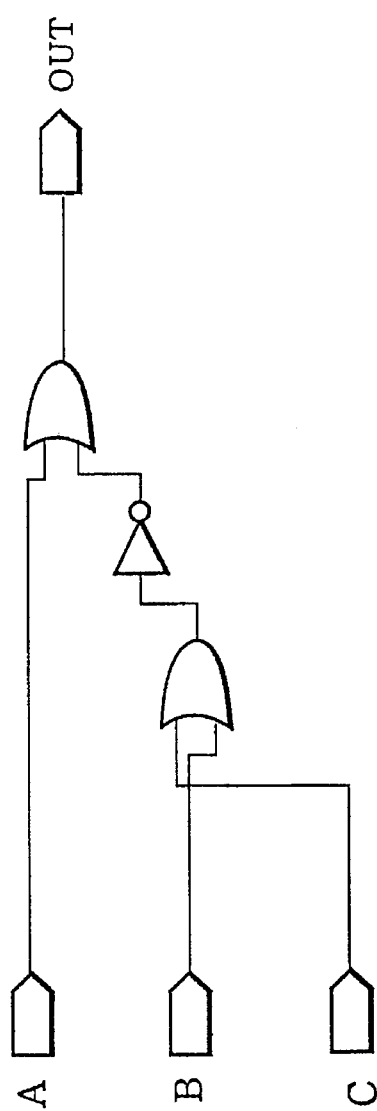

$$A \wedge B \rightarrow \overline{\overline{A} \vee \overline{B}}$$

$$(A \wedge B) \vee (A \wedge C) \rightarrow A \wedge (B \vee C)$$

HEURISTIC CONTROL SYSTEM EMPLOYING EXPERT SYSTEM, NEURAL NETWORK AND TRAINING PATTERN GENERATING AND CONTROLLING SYSTEM

BACKGROUND OF THE INVENTION

1. Field of the Invention

The present invention relates to a learning method and system for a system control in a field of computer-aided design (CAD), and it particularly relates to the learning method and system where a control method varies automatically through a learning process.

2. Description of the Prior Art

In recent years, a very large scale integrated circuit (VLSI) is becoming far more complicated. Therefore, considering the fact that a process for designing the VLSI is ever complicated and the number of processes therefor is far increasing, automation of such design processes is indispensable as a tool for computer-aided design (CAD).

Among the conventional knowledge-based systems, a rule-based system represented by an expert system is widely in use. The expert system automatically controls each rule so that many useful rules can be made separately. Thus, the expert system as a whole is rather easy in terms architecture therefor. However, executability and applicability-thereof are not so desirable. In order to weaken such disadvantages, there is adopted a meta-rule which regulates how to choose a rule. This is why the meta-rule is often called a rule of rule. However, in the meta-rule method where examples of rules available are limited, there is necessitated a plenty of manpowers and man-months to accomplish a task therefor, thus making difficult a modification and maintenance of the meta-rule. For example, in a rule-based logic synthesis system, there are too many of the rules, so that interaction and effectiveness of each rule on a given circuit remains unclear. Therefore, a meta-rule for executing an optimum rule therefor need be re-designed, thus taking a long period of time overall.

Now, the rule-based system for logic optimization is a collection of rules and techniques to improve the circuit quality. Each rule is expressed as a pair such as a target graph and replacement graph. A rule is applied by identifying a portion of the circuit which contains a subgraph isomorhpic to the target graph, and replacing the subgraph with the replacement graph. Each rule application preserves a circuit functionality. For example, technology mapping from Boolean equations starts with a straightforward translation of the equations into gates in a library, and a circuit quality is improved through iterative application of rules.

Furthermore, there is now widely used a neural network system differing from the expert system in its entity. In the field of neural network, there are used several alternative terminologies such as neurocomputation, associative networks, collective computation and connectionism. Compared to the expert system, the neural network is particularly superior in handling exceptions and pattern recognition with relatively small and limited amount of rules.

The neural network, in principle, imitates neural cells and a simplest model therefor can be explained with reference to FIG. 1. As shown in FIG. 1, the neural network can be regarded as a plurality of neural cells or neurons which have a threshold value. A model neuron computes a weighted sum of its inputs from other units, and outputs a one or a zero, if the unit has a binary threshold, according to whether the sum is above or below a certain threshold. The neural network can be divided into a layer-structured neural network and a non-layer structured neural network. In the layer-structured neural network, a back-propagation method which is a learning algorithm is utilized and is suitable for a learning aspect. FIG. 2 shows a three-layer neural network comprising an input layer, an intermediate (hidden) layer and an output layer. In the back-propagation method, plural sets of input patterns and learning patterns are specified. The learning pattern is a target output pattern which is desired to be outputted when the input pattern paired to the learning pattern is inputted to an input layer. In the back-propagation method, weighted factors for a linkage between the layers are adjusted so that an actual output of the neural network becomes as close to the learning pattern as possible. However, such adjustment is iteratively performed to all available inputs as well as all learning patterns, so that the neural network alone consumes huge amount of time particularly for a large-scale problem.

There have also been attempts of using the neural network to provide a proper input to the expert system. However, there has been little study on using neural networks to control operation of rules in an expert-system. Yet in many rule-based systems, the meta-rules are often required to decide which of many possible rules should be used. Then, formation of the meta-rules most frequently requires much of trial-and-error adjustment by specialists, thus increasing the length of time necessary for building an expert system. For example, in an expert system using a neural network to rank backgammon playing rules, an expert was needed to manually rank the rules in a large number of possible game situations.

SUMMARY OF THE INVENTION

In view of the foregoing problems, it is therefore an object of the present invention to provide a heuristic control system for use with a computer-aided design, capable of learning complicated control where there is no obvious correspondence between an output from a neural network thereof and an execution result of an unit to be controlled, and of achieving an optimizing task with fewer number of iterations.

To achieve the object there is provided a heuristic control system comprising: rule-based means for choosing and evaluating a rule among a plurality of given rules; training means for choosing strongly a rule whose evaluation result is favorable based on a predetermined value which evaluates an evaluation result of the rule-based means, and for generating a learning pattern; and neural network means for designing an optimized circuit based on a signal fed from the training means and for sending a resultant signal to the rule-based means for another iteration of heuristic control.

There is also provided a learning method comprising the steps of: choosing and evaluating a rule among a plurality of given rules; generating a learning pattern which brings a desirable result based on the-evaluating step; and choosing and evaluating iteratively a rule among a plurality of given rules.

Other features and advantages of the present invention will become apparent from the following description taken in conjunction with the accompanying drawings.

BRIEF DESCRIPTION OF THE DRAWINGS

FIG. 1 shows a schematic diagram of a neuron.

FIG. 2 shows a schematic diagram of a three-layer neural network.

FIG. 3 shows examples for logic optimization rules.

FIG. 4 shows a heuristic control system according to the present invention.

FIG. 5A shows circuit A which is to be optimized by using the heuristic control system of the present invention.

FIG. 5B shows an optimized circuit over circuit A shown in FIG. 5A.

DETAILED DESCRIPTION OF THE PREFERRED EMBODIMENTS

Figure 6A:
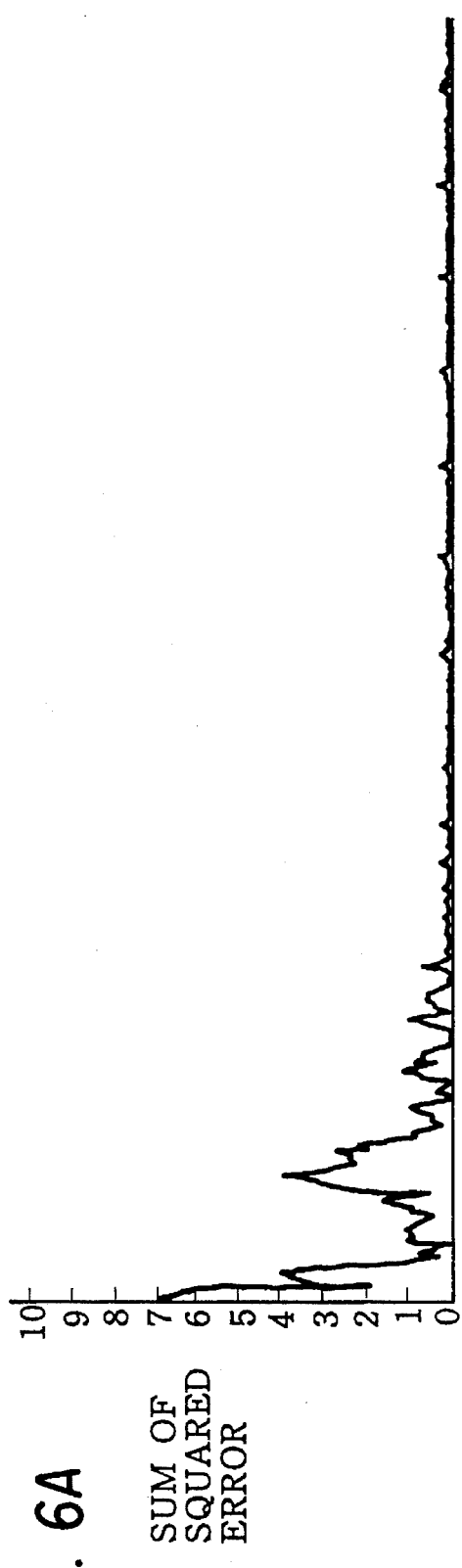
FIG. 6 shows a graph to show an evaluation function f(c) and a sum of squared error (SSE) using the heuristic system shown in FIG. 4.

Features of the present invention will become apparent in the course of the following description of exemplary embodiment and experimental data which are given for illustration of the invention and are not intended to be limiting thereof.

There is available an experimental logic optimization system (referred to as system F hereinafter) which is developed by the same inventor of this patent application and whose detail is discussed in "Incremental timing optimization during multiple stages of logic synthesis" by Seiichi Nishio, Takeshi Kitahara and Masatoshi Sekine, *Proceedings Fourth Annual IEEE International ASIC Conference and Exhibit*, 1991, page 13. A back-propagation neural network is integrated with an experimental logic optimization system based on system F, wherein 23 rules S which can deal with circuits comprising AND, OR and INVERTER gates are included in the logic optimization system. FIG. 3 shows examples for the logic optimization rules. In previous systems described in the PRIOR ART section of this application, at each step of optimization, each rule is activated according to an order described in the rule-activating meta-rules. However, in many cases, the meta-rules are designed only for a specific type of circuit. Thus, a rule order described in such meta-rules may not be appropriate in optimizing other types S circuits.

Therefore, as shown in FIG. 4, the present invention presents a heuristic control system and method in order to adapt a program to new type of circuits automatically.

FIG. 4 illustrates the heuristic control system according to the present invention which comprises a neural network 1, a rule-based system 8 and a training system 2 that trains the neural network 1 to control the rule-based system 8.

The neural network controller 1 comprises three layers of input layer, hidden (intermediate) layer and output layer of 28, 29 and 28 nodes, respectively, with output range of −0.5 through 0.5. In the neural network, units in intermediate layers are often called hidden units, or nowadays "hidden" units are more often used than intermediate units, because they have no direct connection to outside world. The input layer is connected to both the hidden layer and the output layer. The neural network controller 1 operates to learn a usage pattern of the optimization rules. An input to the neural network 1 comprises rule availability signals generated by the rule-based system 8.

At the beginning of each epoch, the rule-based system 3 seeks a circuit against a pattern of each rule already given. A detailed definition for epoch will be given at a later stage. If a portion of the circuit matches the pattern of a rule then that rule can be activated and is regarded as an available rule. Then, the rule is transferred to the neural network 1 as indicated with an arrow mark 4 in FIG. 4.

The present invention is characterized in that the heuristic control system further comprises the training system 2 or a training pattern generating system which trains the neural network 1 (indicated as an arrow mark 7) based on outputs from the rule-based system 3 (indicated as an arrow mark 6) so as to control the rule-based system 3.

A status of each epoch is entered into the neural network 1 as indicated by an arrow mark 4. The status will be −0.5 if the rule is unavailable and 0.5 if the rule is available. Data inputted in the manner to the neural network 1 are propagated through the neural network 1 so that a program thereof activates a rule whose corresponding output node has the highest output so as to modify the circuit accordingly. After the rule is activated and the circuit is modified, the rule-based system 3 estimates and evaluates a size of the circuit by using an optimization evaluating function. For, example, the optimization evaluating function f(c) (referred to as evaluation function f(c)) can be defined as:

$$f(c) = w_1 \cdot (\text{total number of output of elements}) + w_2 \cdot (\text{total number of elements (gates)})$$

where $w_1$ and $w_2$ are weighted factors.

For example, the evaluation function f(c) is evaluated in such manner that when f(c) decreases, namely, when a difference $\Delta f(c)$ is negative, a result is good, while when f(c) increases ($\Delta f(c)$ being positive) a result is bad. In this case, the evaluation is based on that the less the total number of element output is the smaller the area occupied by the circuit becomes. When $\Delta f(c)$ is negative, the training system 2 generates a training pattern having a weighted factor to choose the rule further strongly. When $\Delta f(c)$ is positive, the training system 2 generates a training pattern having a weighted factor not likely to choose the rule. The training patterns generated by the training system 2 are given to the neural network 1 so that a weight of the neural network 1 according to a back-propagation method varies. It is to be noted here that a certain rule is chosen is called that a rule is "fired".

The conventional simple back-propagation neural networks are not good enough at learning a sequence of actions because an input thereto usually consists of only signals from an instance in time, thus the neural network has no memory of what had occurred before so as to bring and refer to it to a present state. Therefore, for situations where a set of rules has to be used in sequence to ultimately bring about a good result, the conventional neural network can not learn the sequence in a manner achieved by the present invention. It is because when the conventional neural network reaches a last step of the sequence and gets rewarded for good performance, the neural network has no way to relearn a previous sequence of actions that are possibly attributive to the present status.

Against above adverse conditions, by building the training pattern generating system 2 into the rule-based system and the neural network, the heuristic control system according to the present invention can integrally make use of previously fired rules. Namely, the training pattern generating system 2 stores an identification number of the activated rule and an input pattern for several previous epochs. Thereby, a running cost during operation of CAD system is significantly reduced. Moreover, a controlling system realized by the heuristic control system of the present invention does not deteriorate in efficiency thereof. The running cost described above includes a time duration necessary for designing the circuit.

Figure 6B:
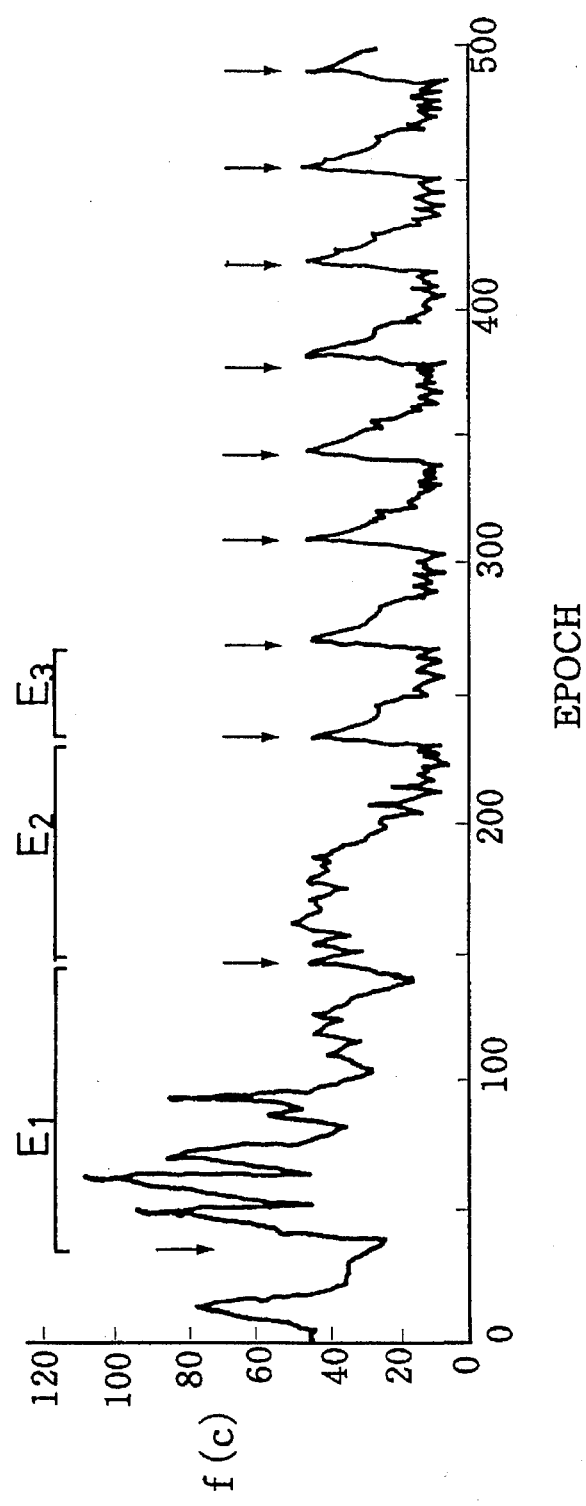

Results of experiment for the above embodiment according to the present invention are shown with reference to FIG. 5 through FIG. 7.

Experiment was performed on a circuit A shown in FIG. 5A. The weighted factors for the back propagation are set to $W_1=1.0$ and $W_2=1.0$.

FIG. 6 shows the evaluation function f(c) and a sum of squared error (SSE) of the neural network 1 as the neural network supported by the heuristic control system 2 learns to optimize the circuit A. The SSE is one of evaluation means for evaluating how data is close to and deviated from a targeted value. Namely, the less the SEE is, the more desirable the data is. Now, the epoch is a cycle of operation in that adaptability of each circuit's converting rule is examined, as a result, an input pattern of 0.5 or −0.5 is transferred to the neural network 1, then a rule having the highest output in the neural network 1 is adapted and a change in the evaluation function f(c) is examined so as to generate a training pattern in the training system 2, and from the training pattern thereby the neural network 2 learns through the back-propagation. In a way, an epoch can be considered a cycle of activation illustrated as arrow marks 6 (→4)→7→5 in FIG. 4.

Referring still to FIG. 6, in first four epochs, the neural network activated rules which were not available. However, since 23 simple correct patterns were presented to the neural network 1 at each epoch and the patterns are generated by operating the rules on circuits, the neural network 1 learned to activate only available rules by the fifth epoch.

Figure 8:
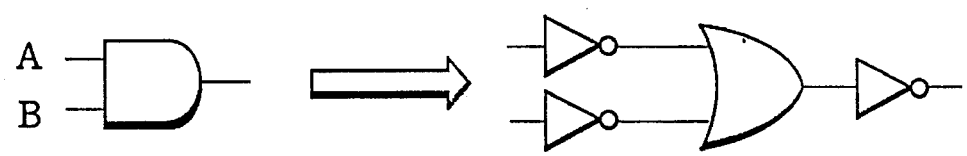
FIG. 8 shows a circuit example adapting De Morgan rule.
Figure 9:
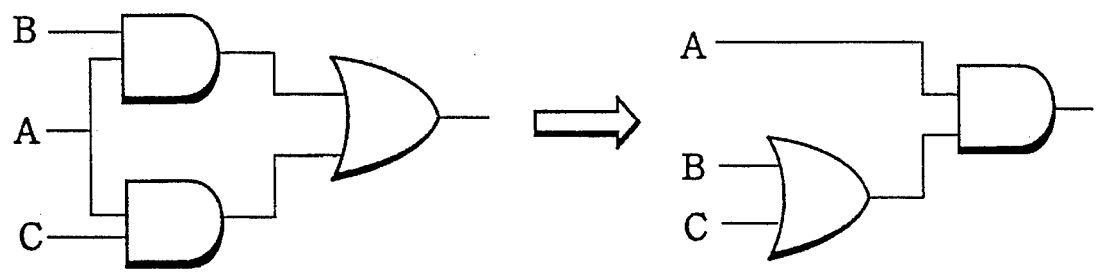
FIG. 9 shows another circuit example adapting another rule.

First, the rule-based system 3 activates a De Morgan rule. With reference to FIG. 8, when a circuit is designed using De Morgan rules, the evaluation function f(c) becomes positive thus of bad result, where the weighted factors $W_1=1$ and $W_2=0$ are set as such in the evaluating function f(c). Now, care must be taken to keeping in mind that there are no absolutely good nor bad result in the course of evaluation. Good or bad is dependent of the evaluating function provided for certain purpose. In actuality, an overall evaluation is somehow much complicated taking many other factors into consideration. With reference to FIG. 9, Δf(c) becomes negative, thus being a good result according to the evaluation function f(c) of a kind.

If the result is as shown FIG. 8, the training system 2 generated patterns which favored other available rules than De Morgan rule, and the training system 2 gradually learned to activate rules that reduced the f(c).

As shown in FIG. 6, when an optimization score, that is a f(c) value, has not decreased for ten epochs, the training system 2 is so controlled that the training system 2 provides the neural network 1 with an initial circuit. This process is shown as vertical arrow marks in FIG. 6 as well as an arrow mark 7 in FIG. 4. Now, when the optimization score has not decreased for ten epochs, such duration thereof is defined to be a plateau since it is rather flat. Let us define E to be the number of epoch taken to become the plateau from the initial circuit. The neural network 1 supported by the training system 2 gradually learned to give higher priority to rules which led to a final optimum circuit. This is also demonstrated by $E_1>E_2>E_3$ in FIG. 6 that the neural network 1 gradually learns to take up rules that bring better results.

Referring still to FIG. 6, by about epoch 250, the neural network 1 supported by the training system 2 learned to optimized the circuit from an initial value of 43 to a final value of 6. Since the neural network activated unavailable rules which did not reduce f(c) over the first five epochs, the SSE at epoch 5 was as high as 6.44. However, by epoch 200 an average. SSE decreased to 0.09. Moreover, by epoch 500 the average SSE was down to 0.03 as the neural network 1 supported by the training system 2 improved in generating outputs that were closer to the desirable training patterns.

Circuit A shown in FIG. 5A is optimized to a circuit shown in FIG. 5B by the heuristic control system of the present invention, demonstrating how significantly the heuristic system works.

Furthermore, the neural network 1 was trained for 1000 epochs using the system F. Thereafter, an experiment was carried out for testing how well a rule ranking generated by the neural network 1 worked on new circuits. A circuit B taken from a multi-level logic synthesis benchmark is used for the testing. Now, the rule ranking means a rule order which the neural network 1 considers most optimum throughout the learning. In the experiment, the heuristic control system successfully reduced the circuit's f(c) from 138 to 40 after invoking 35 rules. It is to be noted that the result of the present invention obtained by using test circuit B above is favorable in picking up optimization rules, compared to employing a local search technique in which there is no neural network concerned therein.

The local search technique is characterized in-that an optimization rule is chosen for a part of circuit in question though the optimization rule chosen is a bad choice for overall circuitry. By the same token, the local search technique is characterized in that an optimization rule is chosen for a circuit at an instance of time though the optimization rule chosen is a bad choice at a final stage. In this connection, the present invention too belongs to the local search technique. However, the present invention clearly differs from the conventional local search in that the learning method system is employed in the heuristic control system to find the optimum rule through learning.

The conventional local search invoked 45 rules in order to reduce the f(c) from 138 to 40 performing on the circuit B. Since the neural network 1 with the training system 2 accomplished a same task using much fewer number of steps, the neural network 1 with the training system 2 according to the present invention is more efficient in selecting rules compared to the local search method. Furthermore, the local search system actually performed each available rule and re-evaluated the modified circuit before it decided which rule to be adapted, thus the local search system took approximately 15 times longer than the heuristic control system in selecting the optimum rule.

Figure 7B:
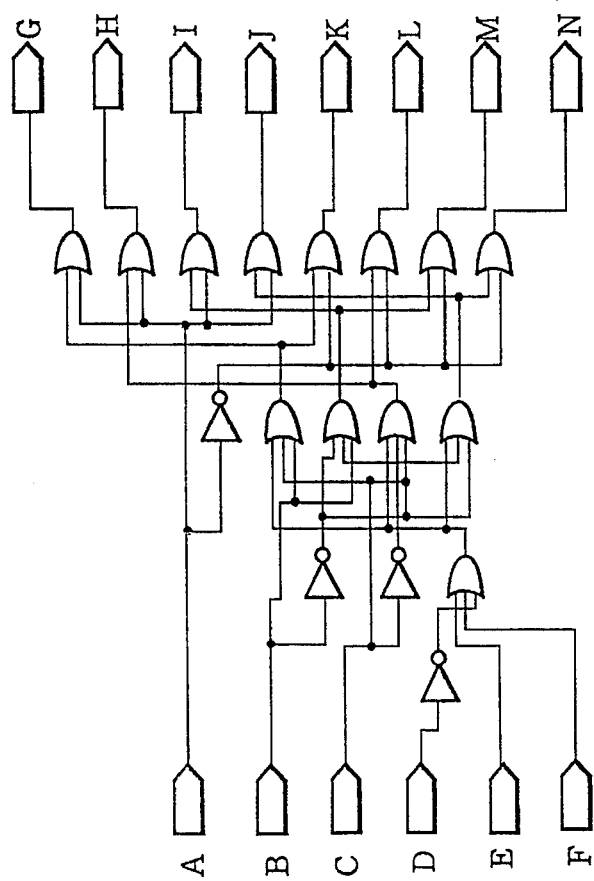
FIG. 7B shows a circuit optimized by the conventional expert system F over circuit B.
Figure 7A:
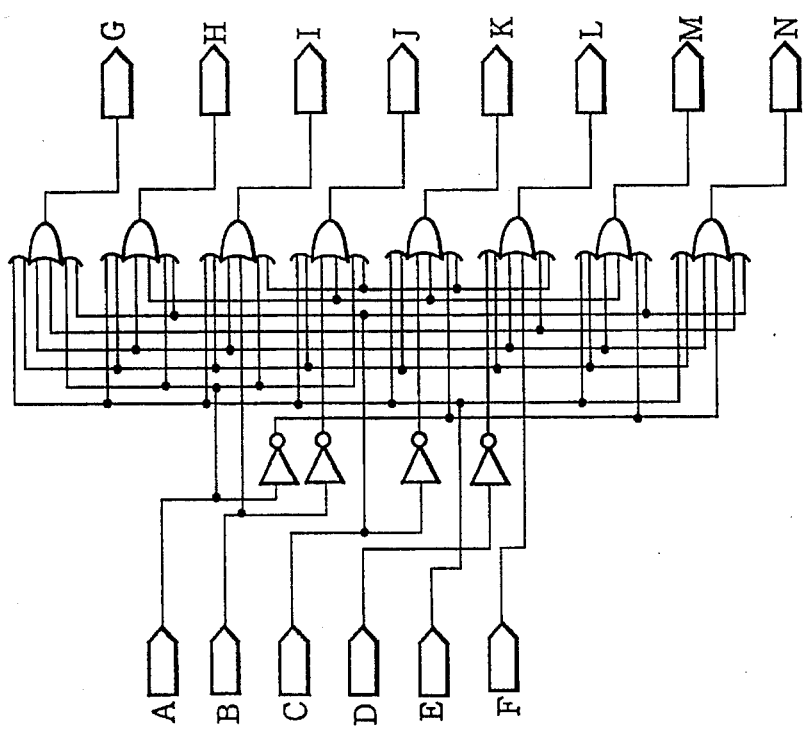
FIG. 7A shows a circuit optimized by the heuristic system over circuit B.

FIG. 7B shows a resultant circuit when the system F is performed on the circuit B for optimization. It is to be noted again here that the system F belongs to the expert system. In contrast, FIG. 7A shows a resultant circuit when the heuristic control system according to the present invention is performed on the same circuit B. In the evaluation function for the heuristic control system, there are taken account the total number of output of elements and the total number of elements (gates), thus the heuristic control system generated a circuit which uses fewer number of gates than of the circuit B. On the other hand, the system F generates a circuit which uses more gates but fewer number of inputs to each gate since the meta-rules thereof were written to generate such circuits. It is to be noted again here that, in general, the less the number of output of elements and the number of gates are, the less an area occupied by the circuit thereof becomes. In the optimized circuit shown in FIG. 7A by the heuristic control system of the embodiment for the present invention, the total number of output of elements and the total number of gates are 14 and 12, respectively, whereas there are 28 and 17, respectively, in the optimized circuit by the system F. Thus, the total number of output elements as well as the total number of gates are significantly reduced compared to the conventional logic optimizing system such as system F.

In summary, by employing the method and system of the heuristic control system by the present invention, how to control system can be learned based on an input-output correlation, without knowing in advance each internal operation of a complicated system. Moreover, by employing the heuristic control system, the running cost such as for maintenance and management incurred during a system operation can be drastically reduced. Moreover, efficiency in heuristic control accomplished by the present invention will not deteriorate.

Besides those already mentioned above, many modifications and variations of the above embodiments may be made without departing from the novel and advantageous features of the present invention. Accordingly, all such modifications and variations are intended to be included within the scope of the appended claims.

What is claimed is:

1. A heuristic control system for use with a computer-aided design, comprising:

processing means including a predetermined learning pattern and a rule-invoking system;

evaluation means for evaluating an operational result of the processing means;

means for generating a training pattern based on a result obtained from the evaluation means; and neural network means for learning to control the processing means by means of the training pattern supplied by the training pattern generating means.

2. The heuristic control system as recited in claim 1, wherein the training pattern generating means compares a plurality of evaluation results obtained by the evaluation means so as to choose a pattern with a favorable result.

3. A heuristic control system for use with a computer-aided design, comprising: rule-based means for choosing and evaluating a rule among a plurality of given rules; training means for choosing strongly a rule whose evaluation result is favorable based on a predetermined value which evaluates an evaluation result of the rule-based means, and for generating a learning pattern; and neural network means for designing an optimized circuit based on a signal fed from the training means and for sending a resultant signal to the rule-based means for another iteration of heuristic control.

4. The heuristic control system as recited in claim 3, wherein the training means invokes and provides to the neural means an initial circuit when the evaluation results do not improve over a predetermined number of iteration.

5. The heuristic control system as recited in claim 3, wherein the neural network means includes a back-propagation system with multiple layers.

6. A learning method in computer-aided design, comprising the steps of choosing and evaluating a rule among a plurality of given rules;

choosing strongly a rule whose evaluation result is favorable based on a predetermined value;

generating a learning pattern which brings a desirable result based on the evaluating step;

designing an optimized circuit based on the learning pattern generated; and choosing and evaluating iteratively a rule among a plurality of given rules.

7. The method of claim 6, wherein in the learning pattern generating step includes providing an initial circuit when the evaluation results do not improve over a predetermined number of iterations.

* * * * *